US008078435B2

(12) United States Patent  
Jenkins et al.

(10) Patent No.: US 8,078,435 B2  
(45) Date of Patent: Dec. 13, 2011

(54) METHOD AND APPARATUS FOR DESIGNING ANY-TO-ANY OPTICAL SIGNAL-TO-NOISE RATIO IN OPTICAL NETWORKS

(75) Inventors: David W. Jenkins, North Aurora, IL (US); Ramasubramanian Anand, Plainfield, IL (US); Hector Ayala, Chicago, IL (US); Abhishek J. Desai, North Aurora, IL (US); Kenneth M. Fisher, Aurora, IL (US)

(73) Assignee: Tellabs Operations, Inc., Naperville, IL (US)

( * ) Notice: Subject to any disclaimer, the term of this patent is extended or adjusted under 35 U.S.C. 154(b) by 495 days.

(21) Appl. No.: 12/228,762

(22) Filed: Aug. 15, 2008

(65) Prior Publication Data

US 2010/0042390 A1    Feb. 18, 2010

(51) Int. Cl.  
*G06F 17/50* (2006.01)

(52) U.S. Cl. .............. 703/2; 703/5; 703/16; 709/239; 398/26

(58) Field of Classification Search .................. 703/2, 5, 703/16; 398/83, 25, 26; 709/239  
See application file for complete search history.

(56) References Cited

U.S. PATENT DOCUMENTS

| | | | |
|---|---|---|---|
| 5,027,079 | A | 6/1991 | Desurvire et al. |
| 6,952,529 | B1 | 10/2005 | Mittal |
| 2003/0071985 | A1 | 4/2003 | Mori et al. |
| 2004/0208576 | A1 | 10/2004 | Kinoshita et al. |
| 2005/0175279 | A1 | 8/2005 | Nakajima et al. |
| 2006/0067694 | A1* | 3/2006 | Nozu .............................. 398/83 |
| 2010/0040364 | A1 | 2/2010 | Jenkins et al. |
| 2010/0040366 | A1 | 2/2010 | Jenkins et al. |
| 2010/0042989 | A1 | 2/2010 | Anand et al. |

OTHER PUBLICATIONS

Momtahan, P., "The Case for Integrating Next-Generation Transport," (White Paper 74.1707E) Tellabs, (Rev. B: 2007, Feb.).  
Jenkins, D. W. and Scholtens, D. A., "Metro WDM Network Design & Evolution: Positioning for the Transition to Optical Meshes," (White Paper 74.1717E), Tellabs, (Rev. A: 2006, October).  
Papakos, K., et al., "Optical Dynamic Core Networks: Design, Implementation and Engineering Considerations,"(White Paper 74.1825E) Tellabs, (Rev. A: 2007, Apr.).  
"BER vs. OSNR," *Circadiant Tech Brief*, (Tech Brief No. TB007), (Feb. 2003).  
Gariépy, D. and Gang, H., "Measuring OSNR in WDM Systems—Effects of Resolution Bandwidth and Optical Rejection Ratio," EXFO Electro-Optical Engineering Inc., Application Note 098, (May 2005). çokrak, A.Cem and Altuncu, A., "Gain and Noise Figure Performance of Erbium Doped Fiber Amplifiers (EDFA)," *J. of Electrical & Electronics Engineering (Istanbul University)*, 4(2):1111-1122 (Jun. 15, 2004).  
U.S. Appl. No. 11/354,705, filed Feb. 14, 2006, by David W. Jenkins.  
U.S. Appl. No. 12/228,763, filed Aug. 15, 2008, by David W. Jenkins, et al.  
U.S. Appl. No. 12/228,776, filed Aug. 15, 2008, by David W. Jenkins, et al.  
U.S. Appl. No. 12/228,826, filed Aug. 15, 2008, by David W. Jenkins, et al.

* cited by examiner

*Primary Examiner* — Thai Phan  
(74) *Attorney, Agent, or Firm* — Hamilton, Brook, Smith & Reynolds, P.C.

(57) ABSTRACT

Optical regeneration is expensive to implement and maintain. A method or corresponding apparatus in an example embodiment of the present invention enables a user to plan an optical regeneration in a network with a reduction of optical regeneration compared to unplanned deployment. An optical regeneration planning tool according to an example embodiment of the present invention can graphically display a representation of a network topology with optical regeneration sites and enable the user to plan optical regenerations at a subset of the sites as a function of characteristics of models of optical network elements and paths within the network topology. Through use of the optical regeneration planning tool, a service provider can save on network deployment and future servicing of optical regeneration equipment.

25 Claims, 9 Drawing Sheets

| CLOCKWISE | A | B | C | D | E | F | G | H | I | J | K | L |
|---|---|---|---|---|---|---|---|---|---|---|---|---|
| A |  | 27.3 | 19.8 | 10.2 | 5.9 | 5.6 | 1.8 | 1.8 | 1.8 | 1.8 | 1.4 | -0.4 |
| B | -0.6 |  | 32.7 | 10.7 | 6.0 | 5.8 | 1.9 | 1.9 | 1.9 | 1.9 | 1.4 | -0.3 |
| C | -0.3 | -0.6 |  | 26.1 | 7.8 | 7.4 | 2.5 | 2.5 | 2.5 | 2.5 | 2.0 | 0.0 |
| D | 0.4 | 0.1 | 0.0 |  | 21.9 | 16.2 | 3.9 | 3.9 | 3.9 | 3.9 | 3.2 | 0.8 |
| E | 0.5 | 0.2 | 0.1 | -0.2 |  | 31.8 | 4.2 | 4.1 | 4.1 | 4.1 | 3.4 | 0.9 |
| F | 2.7 | 2.2 | 2.1 | 1.6 | 0.6 |  | 15.0 | 14.9 | 14.7 | 14.7 | 9.9 | 3.3 |
| G | 3.0 | 2.4 | 2.4 | 1.8 | 0.8 | 0.7 |  | 33.4 | 27.9 | 27.2 | 11.5 | 3.6 |
| H | 3.0 | 2.4 | 2.4 | 1.8 | 0.8 | 0.7 | -0.9 |  | 33.4 | 31.1 | 11.6 | 3.6 |
| I | 3.0 | 2.4 | 2.4 | 1.8 | 0.8 | 0.7 | -0.9 | -0.9 |  | 33.5 | 11.6 | 3.6 |
| J | 3.6 | 3.0 | 2.9 | 2.2 | 1.2 | 1.1 | -0.7 | -0.7 | -0.7 |  | 27.3 | 4.4 |
| K | 10.0 | 7.7 | 7.5 | 5.8 | 3.7 | 3.5 | 0.8 | 0.8 | 0.8 | 0.8 |  | 15.5 |
| L | 27.0 | 11.5 | 11.0 | 7.9 | 4.9 | 4.6 | 1.4 | 1.4 | 1.4 | 1.4 | 1.0 |  |

FIG. 3A

| COUNTER CLOCKWISE | A | B | C | D | E | F | G | H | I | J | K | L |
|---|---|---|---|---|---|---|---|---|---|---|---|---|
| A |  | 0.8 | 1.2 | 1.3 | 1.8 | 3.0 | 3.2 | 10.0 | 10.1 | 10.1 | 10.1 | 15.5 |
| B | 27.0 |  | -0.4 | -0.4 | 0.0 | 0.8 | 0.9 | 3.6 | 3.6 | 3.6 | 3.6 | 4.4 |
| C | 11.3 | 27.3 |  | -0.6 | -0.3 | 0.4 | 0.5 | 3.0 | 3.0 | 3.0 | 3.0 | 3.6 |
| D | 8.5 | 11.6 | 32.7 |  | -0.6 | 0.1 | 0.2 | 2.4 | 2.4 | 2.4 | 2.4 | 3.0 |
| E | 8.2 | 11.0 | 19.6 | 26.1 |  | 0.1 | 0.1 | 2.3 | 2.3 | 2.3 | 2.3 | 2.9 |
| F | 6.2 | 7.7 | 10.0 | 10.4 | 21.9 |  | -0.2 | 1.7 | 1.7 | 1.7 | 1.7 | 2.2 |
| G | 4.0 | 4.9 | 5.9 | 6.0 | 7.9 | 31.8 |  | 0.8 | 0.8 | 0.8 | 0.8 | 1.2 |
| H | 3.5 | 4.3 | 5.1 | 5.3 | 6.7 | 13.1 | 15.0 |  | 0.6 | 0.6 | 0.6 | 0.9 |
| I | 1.0 | 1.4 | 1.8 | 1.9 | 2.5 | 4.0 | 4.2 | 33.4 |  | -0.9 | -0.9 | -0.6 |
| J | 1.0 | 1.4 | 1.8 | 1.9 | 2.5 | 4.0 | 4.2 | 29.5 | 33.4 |  | -0.9 | -0.6 |
| K | 1.0 | 1.4 | 1.8 | 1.9 | 2.5 | 3.9 | 4.1 | 26.4 | 28.0 | 33.5 |  | -0.7 |
| L | 1.0 | 1.4 | 1.8 | 1.9 | 2.5 | 3.9 | 4.1 | 24.0 | 24.7 | 26.6 | 27.3 |  |

FIG. 3B

METHOD AND APPARATUS FOR DESIGNING ANY-TO-ANY OPTICAL SIGNAL-TO-NOISE RATIO IN OPTICAL NETWORKS

RELATED APPLICATIONS

This application is related to U.S. application Ser. No. 11/354,705, filed on Feb. 14, 2006; and Ser. No. 12/228,763, entitled "Method and Apparatus for Reducing Cost of An Optical Amplification in a Network;" Ser. No. 12/228,776, entitled "Method and Apparatus For Displaying and Identifying Available Wavelength Paths Across a Network;" and Ser. No. 12/228,826, entitled "Method and Apparatus For Simplifying Planning and Tracking of Multiple Installation Configurations;" each of which is being filed concurrently. The entire teachings of the above applications are incorporated herein by reference.

BACKGROUND

Optical networks are ideally suited for high-speed, high-bandwidth network communications because they are capable of carrying the highest bandwidth amongst various forms of currently available network communications technologies. Optical networks are often used to form the backbone of communication methodologies, such as the Internet. Optical regenerators are important building elements of a modern optical network. Regeneration is done because the links between communicating elements (or nodes) in an optical network may be too long for optical signals to travel from one element to another. In this case, the signal can become so degraded that it may not be reliably decoded.

Optical Signal-to-Noise Ratio (OSNR) is a common metric used to determine whether a signal can be decoded reliably. The lower the level of OSNR, the less likely it is that a signal can be decoded correctly. Regenerators help to improve (increase) OSNR, thereby improving the reliability of communication.

Regenerators are expensive devices. They require equipment to be installed, serviced, and maintained at each physical regeneration location. Such locations can be geographically distant from one another, difficult to access, and often necessitate paying a lease to use the site. Therefore, it is in the network provider's interest to minimize the use of optical regeneration.

SUMMARY

A method or corresponding apparatus in an example embodiment of the present invention plans deployment of optical network elements. In order to plan deployment of optical network elements, a model of Optical Signal-to-Noise Ratio (OSNR) margins, of optical signals on a path-by-path basis as a function of characteristics of models of optical network elements and paths in a representation of a topology of an optical network, is displayed. The example embodiment identifies locations within the topology at which optical regeneration of the optical signal may be planned on a wavelength-by-wavelength basis and enables a user to select at least one location at which to plan the optical regeneration. Based on planned regeneration, characteristics of the models of optical network elements within the topology can be changed, and the model of OSNR margins as a function of changed characteristics is redisplayed to consolidate planned regeneration among the optical network elements within the representation of the topology.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 3A and 3B are examples of computation of the OSNR margin for optical signals;

DETAILED DESCRIPTION

A description of example embodiments of the invention follows.

Figure 1A:
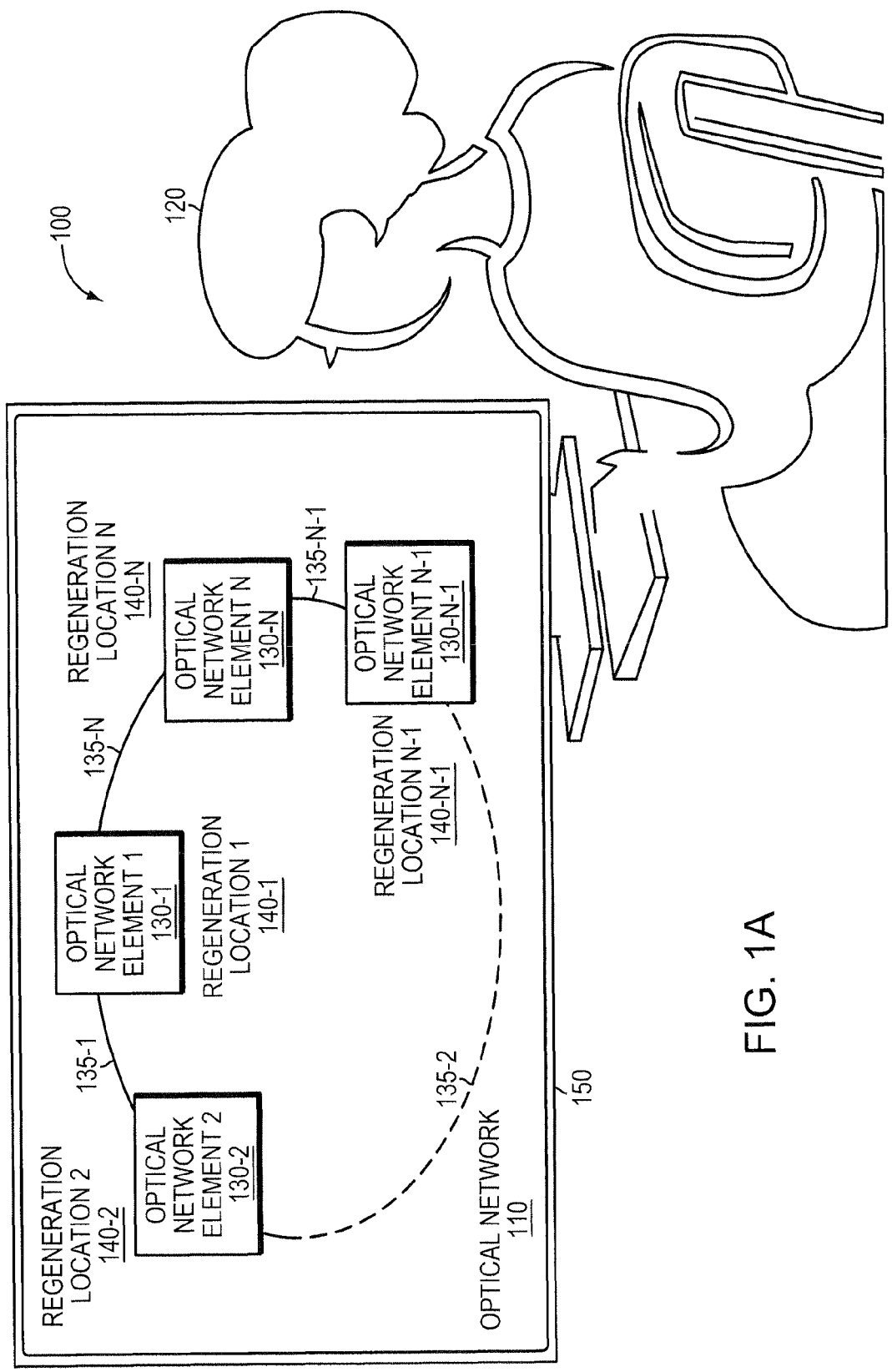
FIGS. 1A and 1B are schematic diagrams that illustrate an example embodiment of the present invention for planning deployment of optical network elements.

FIG. 1A is an example embodiment 100 of the present invention for planning deployment of optical network elements. The topology of the optical network 100 may include a plurality of optical network elements 130 and regeneration locations 140. The example embodiment 100 illustrated in FIG. 1A includes n optical network elements 130_1, 130_2, ..., 130_n–1, 130_n as well as n regeneration location 140_1, 140_2, ..., 140_n–1, 140_n. The optical network 110 may be organized in various arrangements, such as a ring or a mesh topology.

The example embodiment 100 may include a display module 150 that displays a model of Optical Signal-to-Noise Ratio (OSNR) margins of optical signals on a path-by-path basis to a user 120. The displayed margins may be obtained as a function of characteristics of models of optical network elements 130_1, 130_2, ..., 130_n–1, 130_n and paths 135_1, 135_2, ..., 135_n–1, 135_n in a representation of a topology of an optical network 110.

The example embodiment 100 identifies one or more regeneration locations 140_1, 140_2, ..., 140_n–1, 140_n within the topology. Optical regeneration of the optical signal may be planned on a wavelength-by-wavelength basis at the selected regeneration locations 140_1, 140_2, ..., 140_n–1, 140_n.

The user 120 may select at least one regeneration location 140_1, 140_2, ..., 140_n–1, 140_n for planning the optical regeneration. Based on the selected regeneration location 140_1, 140_2, ..., 140_n–1, 140_n, the example embodiment 100 may change characteristics of the models of optical network elements 130_1, 130_2, ..., 130_n–1, 130_n within the topology of the optical network 110.

Once the user 120 has selected one or more regeneration locations, the display module 150 may redisplay the model of OSNR margins as a function of changed characteristics to consolidate planned regeneration among the optical network elements 130_1, 130_2, . . . , 130_n−1, 130_n within the representation of the topology of the optical network 110.

Figure 1B:
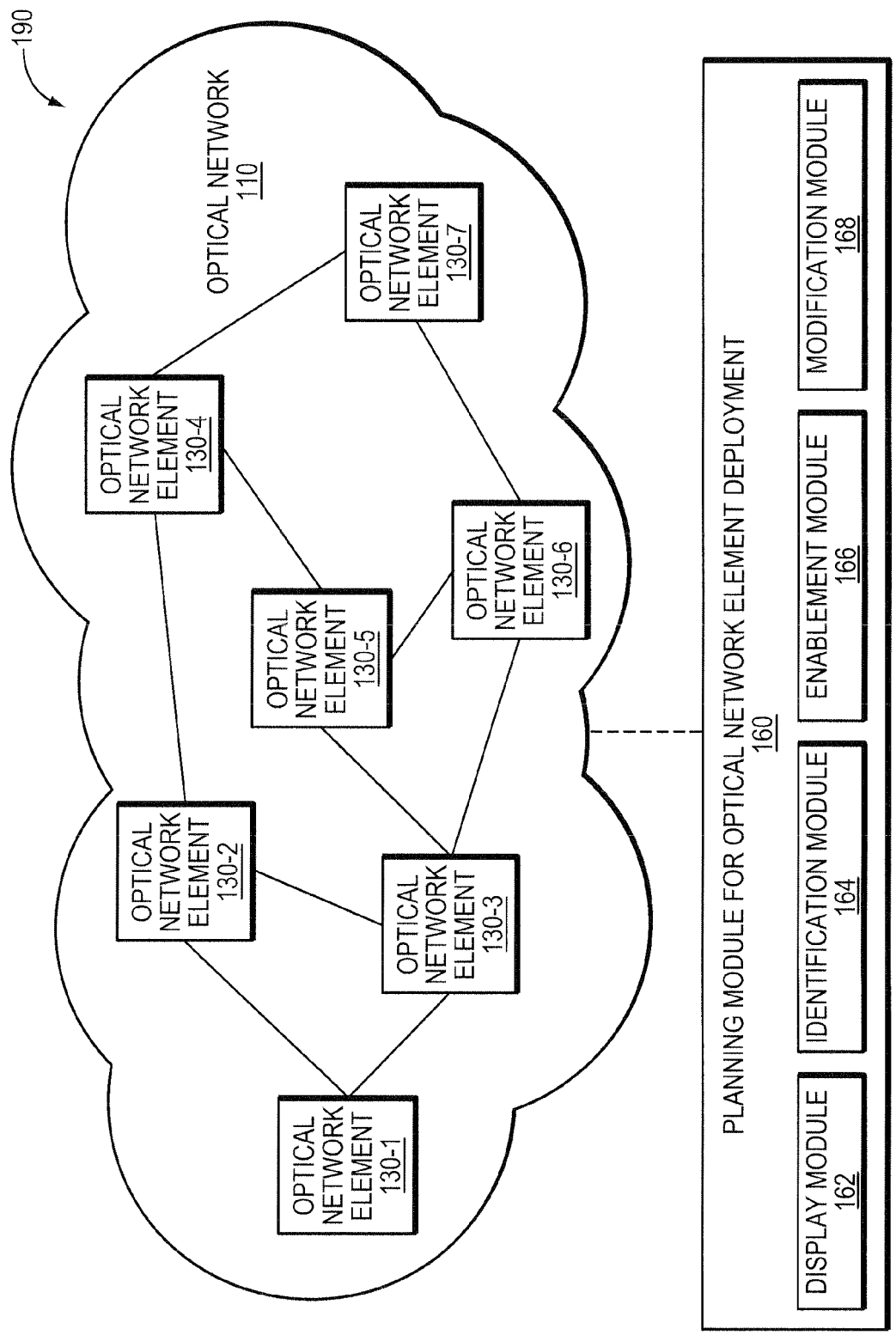

FIG. 1B illustrates an example embodiment 190 of the present invention for planning deployment of optical network elements 130. The topology of the optical network 190 may include a plurality of optical network elements 130. The example embodiment 190 illustrated in FIG. 1 B includes seven optical network elements 130_1, 130_2, . . . , 130_6, 130_7. The example embodiment may include a planning module for optical network element deployment 160. The planning module 160 may include a display module 162 that displays a model of Optical Signal-to-Noise Ratio (OSNR) margins of optical signals on a path-by-path basis. The display module 162 may obtain the model of OSNR margins as a function of characteristics of models of optical network elements and paths in a representation of a topology of an optical network. The planning module 160 may also include an identification module 164 that identifies regeneration locations within the topology on a wavelength-by-wavelength basis. The planning module 160 may also include an enablement module 166 that allows a user to select at least one location at which to plan the optical regeneration. A modification module 166 may also be included in the planning module 160. The modification module 166 changes characteristics of the models of optical network elements within the topology based on planned regeneration. The display module 162 may redisplay the model of OSNR margins as a function of changed characteristics to consolidate planned regeneration among the optical network elements 130 within the representation of the topology.

In the view of the foregoing, the following description illustrates example embodiments and features that may be incorporated into a system for planning deployment of optical network elements, where the term "system" may be interpreted as a system, subsystem, device, apparatus, method, or any combination thereof.

The system may update the model of OSNR margins based on a change in models of the elements in locations selected. The system may display or redisplay the OSNR margins in a tabular or graphical form. The system may highlight OSNR margins below a threshold. The system may highlight OSNR margins within different threshold regions with different indicators. The system may highlight OSNR margins requiring multiple regenerations within a path of the representation of the topology. The system may highlight an optical network element at which regeneration can be planned without adding additional optical network elements.

The system may import the characteristics of the models of the optical network elements and paths from a database. The system may calculate the characteristics of the models of the optical network elements and paths from a selectable number of bit rates and apply calculated characteristics of the models of the optical network elements and paths in displaying or re-displaying the model of OSNR margins.

The system may overlay non-technical factors onto the model of OSNR margins and disable user selection of regeneration at a subset of locations as a function of the non-technical factors. The non-technical factors may include at least one of following non-technical factors: cost, expected future traffic pattern, facility space, or contractual obligations.

The representation of the topology of the optical network may include a ring or a mesh topology.

Figure 2:
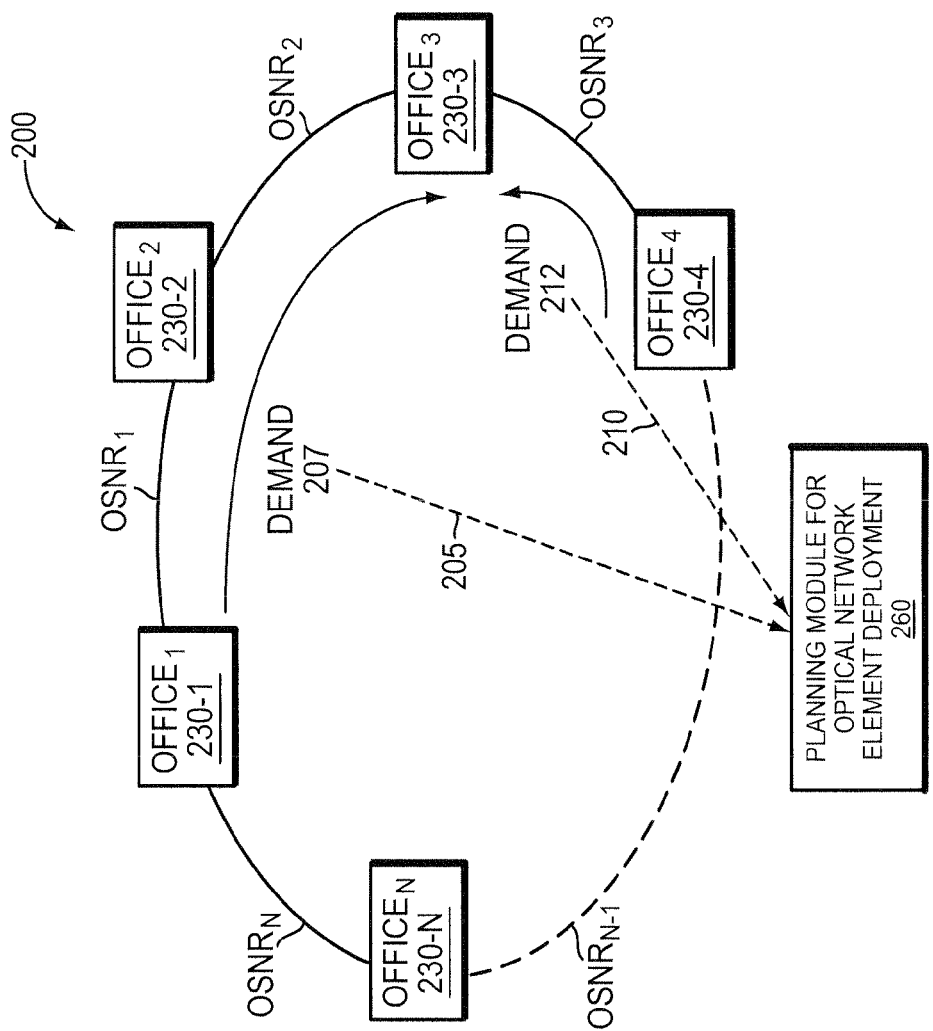
FIG. 2 is a schematic diagram that illustrate an example embodiment of the present invention for identifying locations within the topology at which optical regeneration of the optical signal may be planned on a wavelength-by-wavelength basis.

FIG. 2 illustrates an example embodiment 200 of the present invention for identifying locations within the topology at which optical regeneration of the optical signal may be planned on a wavelength-by-wavelength basis. A set of arrows 205, 210 depicts the demands 207, 212 that are to be planned for network deployment. Each demand is a point-to-point communications link that is to be established between two offices. The offices may also be referred to as nodes or optical network elements. In this example embodiment, the demands 207, 212 between office$_1$ 230_1 and office$_3$ 230_3 and office$_3$ 230_3 and office$_4$ 230_4 are illustrated. In the ring network depicted here, demands 207, 212 are depicted as being serviced in a particular direction around the ring, though each of these demands 207, 212 could be serviced in the opposite direction around the ring. In general, in a mesh network, there may be a plurality of available paths over which a demand can be serviced. The planning module 260 is responsible for taking all demands and determining the best way to route them through the network, as well as where within the network topology to place optical regenerators and other optical network elements. The example embodiment 200 may achieve multi-hop network communication by sending data over a series of point-to-point communication links through the network.

For any demand that originates at one office location (e.g., office$_1$ 230_1) and ends at another office location (e.g., office$_3$ 230_3), there must be sufficient optical signal at the destination in relation to the noise detected for communication to be maintained with a specified tolerance for errors in transmission. The optical signal-to-noise ratio (OSNR) must be above a threshold that depends on the data rate measured in bits per second, the use of forward error correction and any optical or other impairments stemming from fiber or other equipment in the optical path.

FIGS. 3A and 3B illustrate a sample computation of the OSNR margin. The OSNR margin is equal to the OSNR less any optical impairment penalties and less the OSNR limit for the detector.

FIG. 3A is a table that includes a sample computation of the OSNR margin in decibels (dB) for optical signals traveling clockwise. The sample computation is obtained assuming that optical signals travel in an optical network, with a ring conFIG.uration, between twelve nodes labeled as A, B, C, D, E, F, G, H, I, J, K, and L. The table includes the OSNR margins for each communications link from a given node to every other node in the network.

Each row of the table represents a source node and each column represents a destination node. As an example, for optical signals traveling from node A to node D via nodes B and C, starting from the row labeled A to the column labeled D, the value of OSNR margin is 20.6 dB.

Similarly, using the table, the value of OSNR margin for optical signals traveling clockwise from node A to node B is 26.8 dB; and the value of the OSNR margin for optical signals traveling in the clockwise direction from node A to node C, through node B, is 19.3 dB. It is assumed that optical signals will not have the same source and destination node. Consequently, the table cells along the diagonal, which correspond to equal source and destination nodes, have been blacked out.

The table entries that have values below 0 dB are shaded in light gray. Negative OSNR margin values indicate that transmission cannot be reliably maintained without the use of electro-optical regeneration (or regenerations) of the optical signal between the source and destination at a location where the OSNR margin is greater than zero.

FIG. 3B is a table that includes a sample computation of the OSNR margin, in decibels (dB), for optical signals traveling counter clockwise. Similar to the table shown in FIG. 3A, the sample computation is obtained assuming that optical signals travel in an optical network, with a ring configuration, between twelve nodes labeled as A, B, C, D, E, F, G, H, I, J, K, and L. As in FIG. 3A, the table includes the OSNR margins for each communications link from a given node to every other node in the network The rows of the table designate the source nodes and the columns designate the destination nodes. For example, for traffic from node A to node D via nodes L, K, J, I, H, G, F and E, the OSNR margin may be found from the row labeled A and column labeled D.

The tables shown in FIGS. 3A and 3B are cyclic, meaning that the values in column L are computed using values in column A. In this example, many of the possible paths require regeneration. However, there are networks that do not require any regeneration. The OSNR margin values shown in FIGS. 3A and 3B can be used in such networks as a means to inform the planner whether regenerations will ever be required. It may be the case that some nodes will never have traffic and the planner may disregard these rows and columns. In ring networks, where there are paths that require regeneration, the planner may wish to designate at least one node as a regeneration node because of multiplexing equipment that may be required at the installation of the ring or for space limitation of some nodes or other factors. A node that is a good candidate is node F, where all values are positive in both directions, so all demands can be safely regenerated. Another good choice is node C, where all demands can be regenerated except for B to C via A, L, K, J, I, H, G, F, E and D. The planner may decide to use this node because that node has terminating demands and requires multiplexing equipment. The planner may decide to use this node for various reasons: space limitations in node F, smaller population center in B or C and less likelihood of this problematic demand or a limited number of services allowed on this ring, or other business factors.

Similarly any node or nodes can be chosen as regeneration nodes. Using this method, the planner has adequate information to be able to make a good choice.

For traffic that is protected using schemes like UPSR or BLSR or equivalents, both clockwise and counter-clockwise paths are used. While this method can be used with chains, where the nodes do not form a ring, the requirement for protection for many of the services deployed on a network implies the heavy use of rings.

To apply these tables to chains, the table is computed with no relationship between column A and column L, and the table assumes one path between any two nodes.

Figure 4:
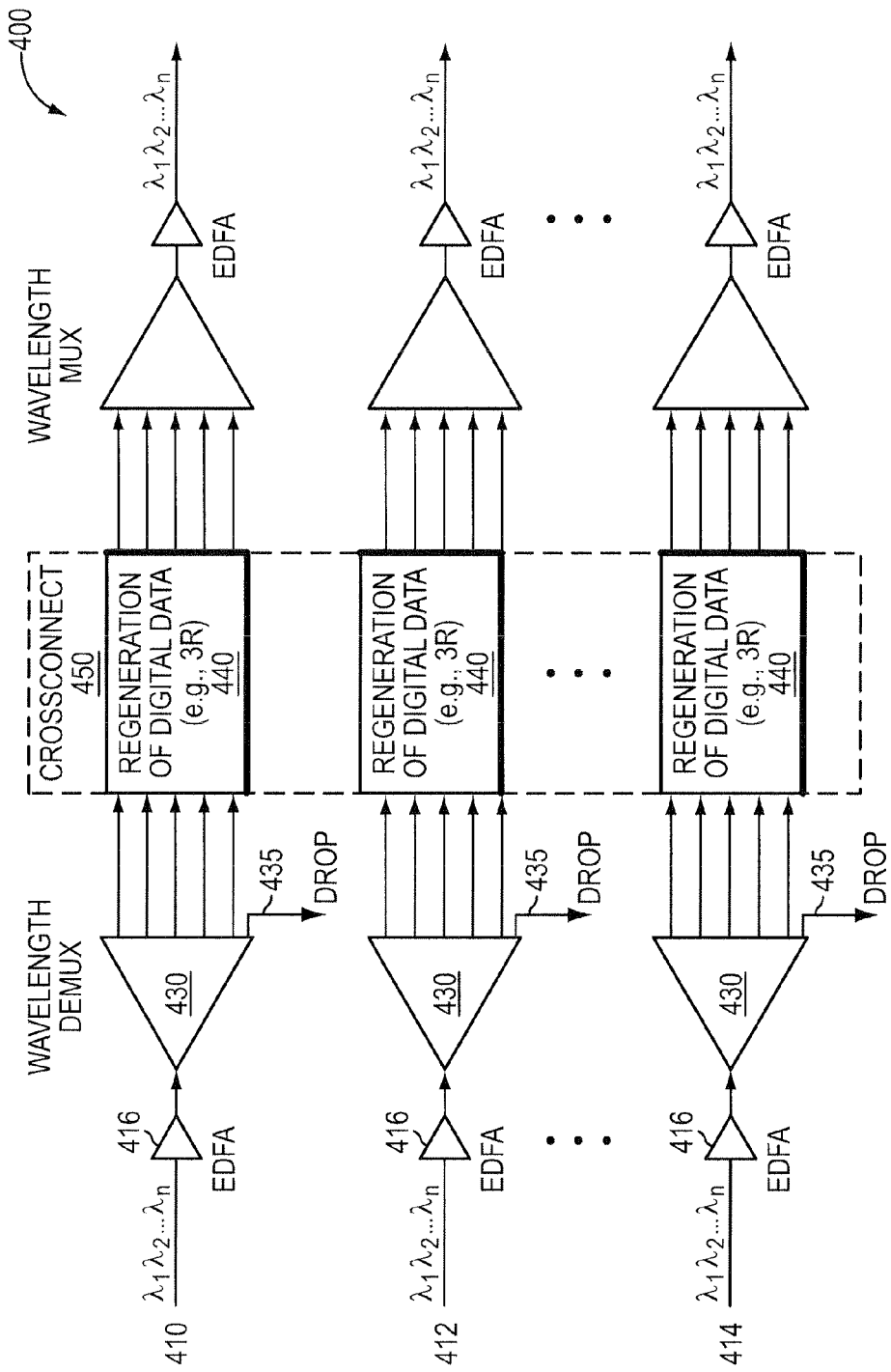
FIG. 4 is an example embodiment of the present invention.

FIG. 4 is an example embodiment of the present invention. The diagram 400 shown in FIG. 4 represents an office (or network node) according to an example embodiment of the present invention. In this example, three incoming optical fibers 410, 412, 414 are shown, each carrying data on n wavelengths. The optical signal is first amplified using an Erbium-doped fiber amplifier (EDFA) 416, and subsequently demultiplexed 430. The demultiplexer 430 takes as input an optical fiber 410, 412, 414 with data carried on multiple wavelengths, and separates each wavelength, implying that there are a total of n output signals from the demultiplexer 430. A demultiplexed 430 signal can either be dropped 435 or regenerated 440. It should be understood that regenerating an optical signal is done on a wavelength-by-wavelength basis, not a combination of wavelengths. Also, it should be understood that the regenerating need not occur on every wavelength between the de-multiplexers 430 and multiplexers 450.

When a signal is dropped 435, this corresponds to data arriving at its destination, without the need for relaying to another office within the network. When a signal is regenerated 440, it is fed into a regeneration module. The example embodiment 400 depicts a 3R regeneration module, which conducts regeneration, retiming, and reshaping. This is the most conservative approach to optical regeneration, because it involves detecting the bit clock in the signal and reclocking, thereby reinstating the optical signal to its original form. Alternative techniques for regeneration that are less demanding eliminate retiming, or simply retransmit the signal without reshaping. These techniques generate less reliable signals than those created using 3R regeneration.

The example embodiment 400 outlines the regeneration modules as a single crossconnect 450. This is because the regeneration modules can also serve as a switch, whereby incoming signals are regenerated and their order is re-arranged. As an example, the topmost demultiplexed optical signal can be regenerated and switched through the crossconnect 450 to emerge on any of the output lines. Note that no two optical signals can be switched onto the same output line. Finally, once the optical signals have been passed through the crossconnect, they are multiplexed 450 onto their respective optical fibers (exactly opposite the demultiplexing process 430), amplified using an EDFA 416, and transmitted along the fiber on to the next office.

Figure 5:
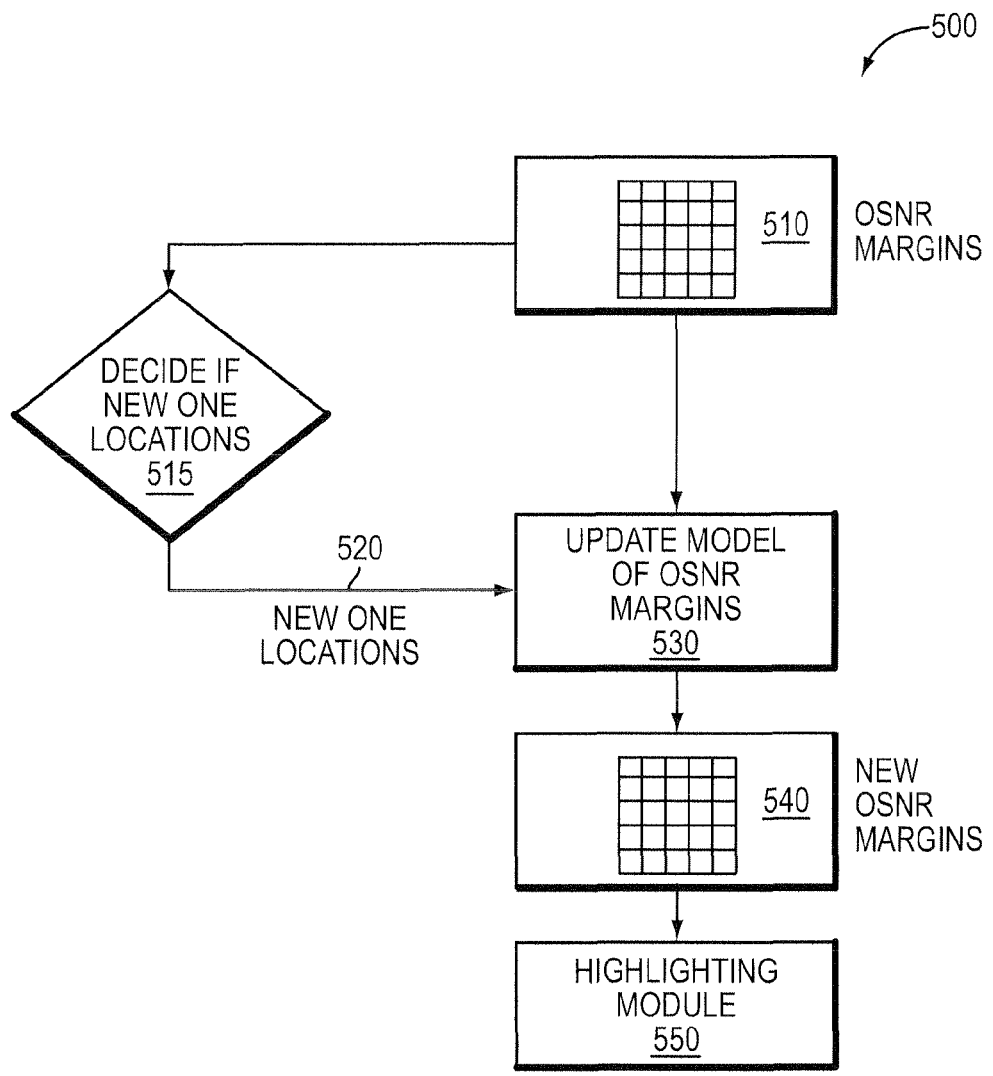
FIG. 5 is a flow diagram of an example embodiment of the present invention for highlighting Optical Signal-to-Noise Ratio (OSNR) margins.

FIG. 5 is a flow diagram 500 of an example embodiment of the present invention for highlighting OSNR margins. The example embodiment may start with an OSNR margin table 510 similar to the tables described in FIGS. 3A and 3B. The example embodiment then proceeds to determine if additional and/or new optical network element locations are required 515. If the example embodiment determines that new optical network element locations are required 520, it proceeds to identify the locations at which new optical network elements need to be added. The example embodiment then changes and updates the model of OSNR margins 530 and generates a new OSNR margin table 540. The highlighting module 550 may then highlight OSNR margins that are below a threshold. The lighting module 550 may also highlight OSNR margins that require multiple generations within a path of the representations of the topology. Additionally, the highlighting module 550 may highlight an optical network element at which regeneration can be planned without adding additional optical network elements.

Figure 6:
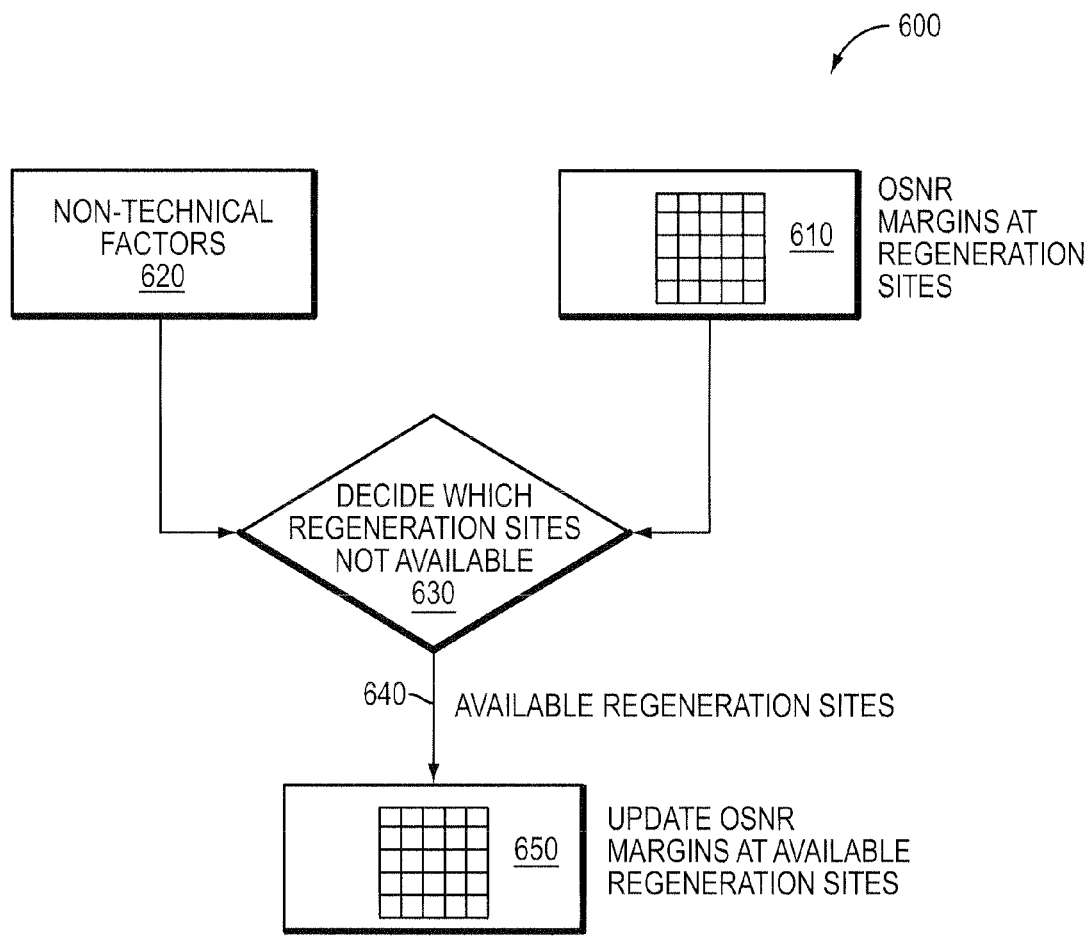
FIG. 6 is a flow diagram of an example embodiment of the present invention for updating OSNR margins at available regeneration sites.

FIG. 6 is a flow diagram 600 of an example embodiment of the present invention for updating OSNR margins at available regeneration sites. The example embodiment may obtain the values of OSNR margins at regeneration sites using OSNR margin tables 610 such as those shown in FIGS. 3A and 3B. The example embodiment may also consider non-technical factors 620 such as cost, expected future traffic pattern, facility space, or contractual obligations. Given the table(s) of OSNR margin values at regeneration sites 610 and the non-technical factors 620, the example embodiment may determine the generation sites that are not available 630. Based on the unavailable regeneration sites, the example embodiment may determine the sites that are available for regeneration 640. Given the available regeneration sites 640, the example embodiment may update the corresponding values of the table(s) of OSNR margin at the available regeneration sites 650.

Figure 7:
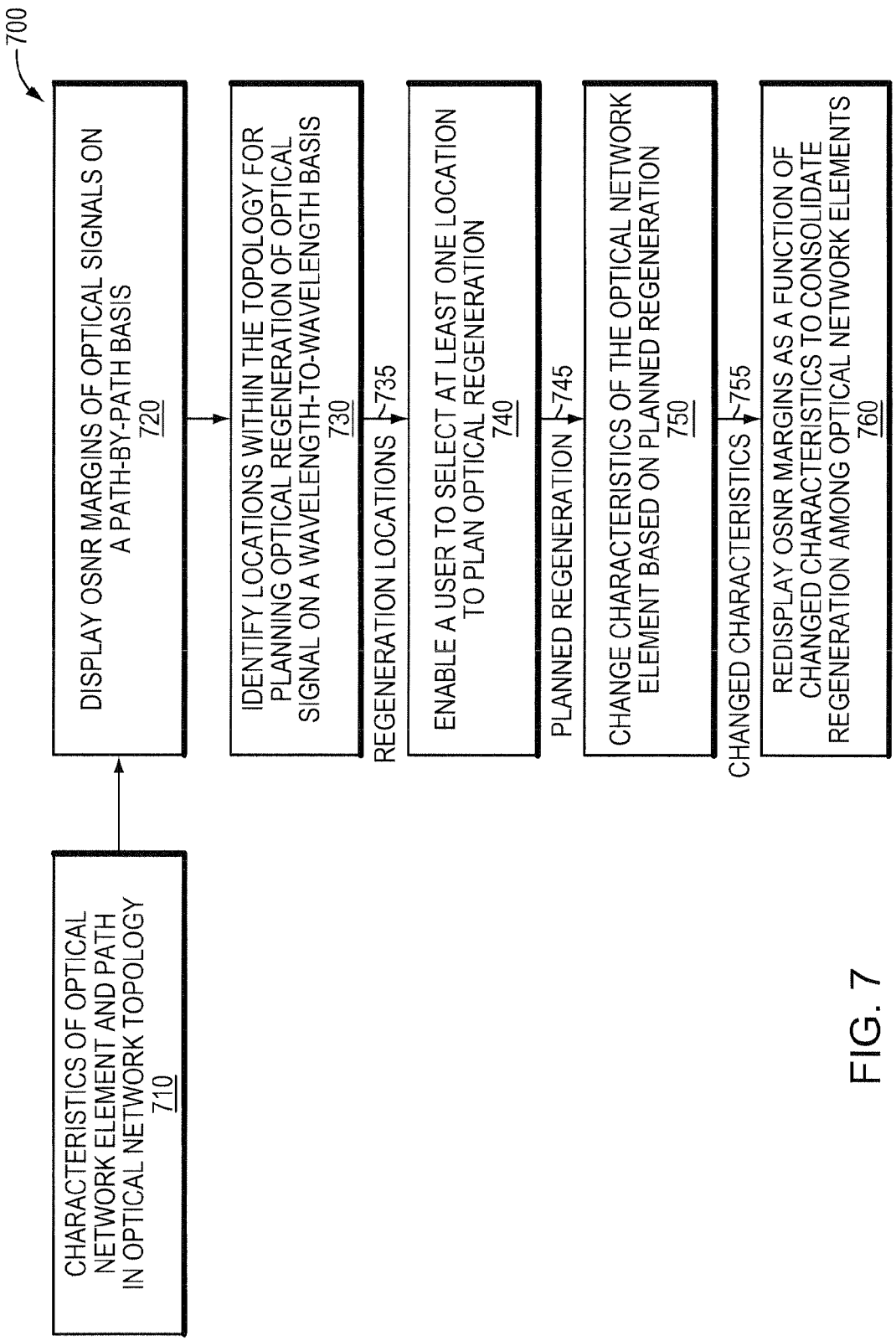
FIG. 7 is a high level flow diagram of an example embodiment of the present invention.

FIG. 7 is a high level flow diagram 700 of an example embodiment of the present invention. The example embodiment may display a model of OSNR margins of optical signals on a path-by-path basis 720 as a function of characteristics of models of optical network elements and paths in a representation of a topology of an optical network 710. The example embodiment may identify locations within the topology at which optical regeneration of the optical signal may be planned on a wavelength-by-wavelength basis 730.

Using the identified regeneration locations 735, the example embodiment may enable a user to select at least one location at which to plan the optical regeneration 740. Given the planned regeneration 745, the example embodiment may change characteristics of the models of optical network elements within the topology 750. Based on the changed characteristics 755, the example embodiment may redisplay the model of OSNR margins as a function of changed characteristics to consolidate planned regeneration among the optical network elements within the representation of the topology 760.

It should be understood that procedures, such as those illustrated by flow diagram or block diagram herein or otherwise described herein, may be implemented in the form of hardware, firmware, or software. If implemented in software, the software may be implemented in any software language consistent with the teachings herein and may be stored on any computer readable medium known or later developed in the art. The software, typically, in form of instructions, can be coded and executed by a processor in a manner understood in the art.

While this invention has been particularly shown and described with references to example embodiments thereof, it will be understood by those skilled in the art that various changes in form and details may be made therein without departing from the scope of the invention encompassed by the appended claims.

What is claimed is:

1. A method for planning deployment of optical network elements comprising:
    displaying a model of Optical Signal-to-Noise Ratio (OSNR) margins of optical signals on a path-by-path basis as a function of characteristics of models of optical network elements and paths in a representation of a topology of an optical network;
    identifying locations within the topology at which optical regeneration of the optical signal may be planned on a wavelength-by-wavelength basis;
    enabling a user to select at least one location at which to plan the optical regeneration;
    changing characteristics of the models of optical network elements within the topology based on planned regeneration; and
    redisplaying the model of OSNR margins as a function of changed characteristics to consolidate planned regeneration among the optical network elements within the representation of the topology.

2. The method of claim 1 further including updating the model of OSNR margins based on a change in models of the elements in locations selected.

3. The method of claim 1 further including displaying or redisplaying the OSNR margins in a tabular or graphical form.

4. The method of claim 1 further including highlighting OSNR margins below a threshold.

5. The method of claim 1 further including highlighting OSNR margins within different threshold regions with different indicators.

6. The method of claim 1 further including highlighting OSNR margins requiring multiple regenerations within a path of the representation of the topology.

7. The method of claim 1 further including highlighting an optical network element at which regeneration can be planned without adding additional optical network elements.

8. The method of claim 1 further including importing the characteristics of the models of the optical network elements and paths from a database.

9. The method of claim 1 further including calculating the characteristics of the models of the optical network elements and paths from a selectable number of bit rates and applying calculated characteristics of the models of the optical network elements and paths in displaying or re-displaying the model of OSNR margins.

10. The method of claim 1 further including overlaying non-technical factors onto the model of OSNR margins and disabling user selection of regeneration at a subset of locations as a function of the non-technical factors.

11. The method of claim 10 wherein the non-technical factors include at least one of following non-technical factors: cost, expected future traffic pattern, facility space, or contractual obligations.

12. The method of claim 1 wherein the representation of the topology of the optical network includes a ring, a linear, or a mesh topology.

13. An apparatus to plan deployment of optical network elements comprising:
    a display module to display a model of Optical Signal to Noise Ratio (OSNR) margins of optical signals on a path-by-path basis as a function of characteristics of models of optical network elements and paths in a representation of a topology of an optical network;
    an identification module to identify locations within the topology at which optical regeneration of the optical signal may be planned on a wavelength-by-wavelength basis;
    an enablement module to enable a user to select at least one location at which to plan the optical regeneration;
    a modification module to change characteristics of the models of optical network elements within the topology based on planned regeneration; and
    the display module arranged to redisplay the model of OSNR margins as a function of changed characteristics to consolidate planned regeneration among the optical network elements within the representation of the topology.

14. The apparatus of claim 13 further including an updating module to update the model of OSNR margins based on a change in models of the elements in locations selected.

15. The apparatus of claim 13 wherein the display module is further arranged to display or redisplay the OSNR margins in a tabular or graphical form.

16. The apparatus of claim 13 further including a highlighting module to highlight OSNR margins below a threshold.

17. The apparatus of claim 13 further including a highlighting module to highlight OSNR margins within different threshold regions with different indicators.

18. The apparatus of claim 13 further including a highlighting module to highlight OSNR margins requiring multiple regenerations within a path of the representation of the topology.

19. The apparatus of claim 13 further including a highlighting module to highlight an optical network element at which regeneration can be planned without adding additional optical network elements.

20. The apparatus of claim 13 further including an importing module to import the characteristics of the models of the optical network elements and paths from a database.

21. The apparatus of claim 13 further including a calculation module arranged to calculate the characteristics of the models of the optical network elements and paths from a selectable number of bit rates and apply calculated characteristics of the models of the optical network elements and paths in displaying or re-displaying the model of OSNR margins.

22. The apparatus of claim 13 further including a module arranged to overlay non-technical factors onto the model of OSNR margins and disable user selection of regeneration at a subset of locations as a function of the non-technical factors.

23. The apparatus of claim 22 wherein the non-technical factors include at least one of following non-technical factors: cost, expected future traffic pattern, facility space, or contractual obligations.

24. The apparatus of claim 13 wherein the representation of the topology of the optical network includes a ring, a linear, or a mesh topology.

25. A computer program product comprising a computer readable medium having computer readable code stored thereon, which, when executed by a processor, causes the processor to:
    display a model of Optical Signal to Noise Ratio (OSNR) margins of optical signals on a path-by-path basis as a function of characteristics of models of optical network elements and paths in a representation of a topology of an optical network;
    identify locations within the topology at which optical regeneration of the optical signal may be planned on a wavelength-by-wavelength basis;
    enable a user to select at least one location at which to plan the optical regeneration;
    change characteristics of the models of optical network elements within the topology based on planned regeneration; and
    redisplay the model of OSNR margins as a function of changed characteristics to consolidate planned regeneration among the optical network elements within the representation of the topology.

\* \* \* \* \*